US012775518B2

(12) United States Patent
Gowrishankar et al.

(10) Patent No.: US 12,775,518 B2
(45) Date of Patent: Oct. 27, 2026

(54) LOW POWER SINGLE SAMPLER $PAM_3$ ERROR SAMPLING

(71) Applicant: Advanced Micro Devices, Inc., Santa Clara, CA (US)

(72) Inventors: Raghavendra Rukmani Gowrishankar, Bangalore (IN); Kamlesh Satyadev Singh, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 250 days.

(21) Appl. No.: 18/620,233

(22) Filed: Mar. 28, 2024

(65) Prior Publication Data

US 2025/0307070 A1 Oct. 2, 2025

(51) Int. Cl.
*G06F 11/10* (2006.01)

(52) U.S. Cl.
CPC ................................ *G06F 11/1004* (2013.01)

(58) Field of Classification Search
CPC .................................................. G06F 11/1004
See application file for complete search history.

(56) References Cited

U.S. PATENT DOCUMENTS

| | | | | |
|---|---|---|---|---|
| 2013/0156126 | A1* | 6/2013 | Chung | H04L 27/06 375/268 |
| 2013/0195155 | A1* | 8/2013 | Pan | H03D 1/00 375/317 |
| 2018/0248577 | A1* | 8/2018 | Hossain | H04L 25/0264 |
| 2021/0385060 | A1* | 12/2021 | Van Ierssel | H04L 7/06 |
| 2023/0236996 | A1* | 7/2023 | Saraswat | G06T 1/60 |
| 2023/0367357 | A1* | 11/2023 | Wu | G06F 1/08 |
| 2025/0036520 | A1* | 1/2025 | Lim | G06F 11/1004 |

* cited by examiner

*Primary Examiner* — Albert Decady
*Assistant Examiner* — Enamul M Kabir
(74) *Attorney, Agent, or Firm* — Slater Matsil, LLP

(57) ABSTRACT

An error sampling and decoding system is disclosed. The system includes a reference circuit configured to generate first and second reference values; a comparator configured to receive a first error symbol, and to generate serial error data representing the first error symbol based on successive comparisons of the first error symbol with the first and second reference values; and a deserializer circuit configured to generate parallel data corresponding with the first error symbol based on the serial error data.

20 Claims, 9 Drawing Sheets

LOW POWER SINGLE SAMPLER $PAM_3$ ERROR SAMPLING

BACKGROUND

Various circuits and systems use PAM3 (Pulse Amplitude Modulation 3) encoding for data communication. For example, graphics double data rate 7 (GDDR7) systems may use PAM3 encoding for error signaling. Error sampling systems are used to receive and decode the PAM3 encoded error signals.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
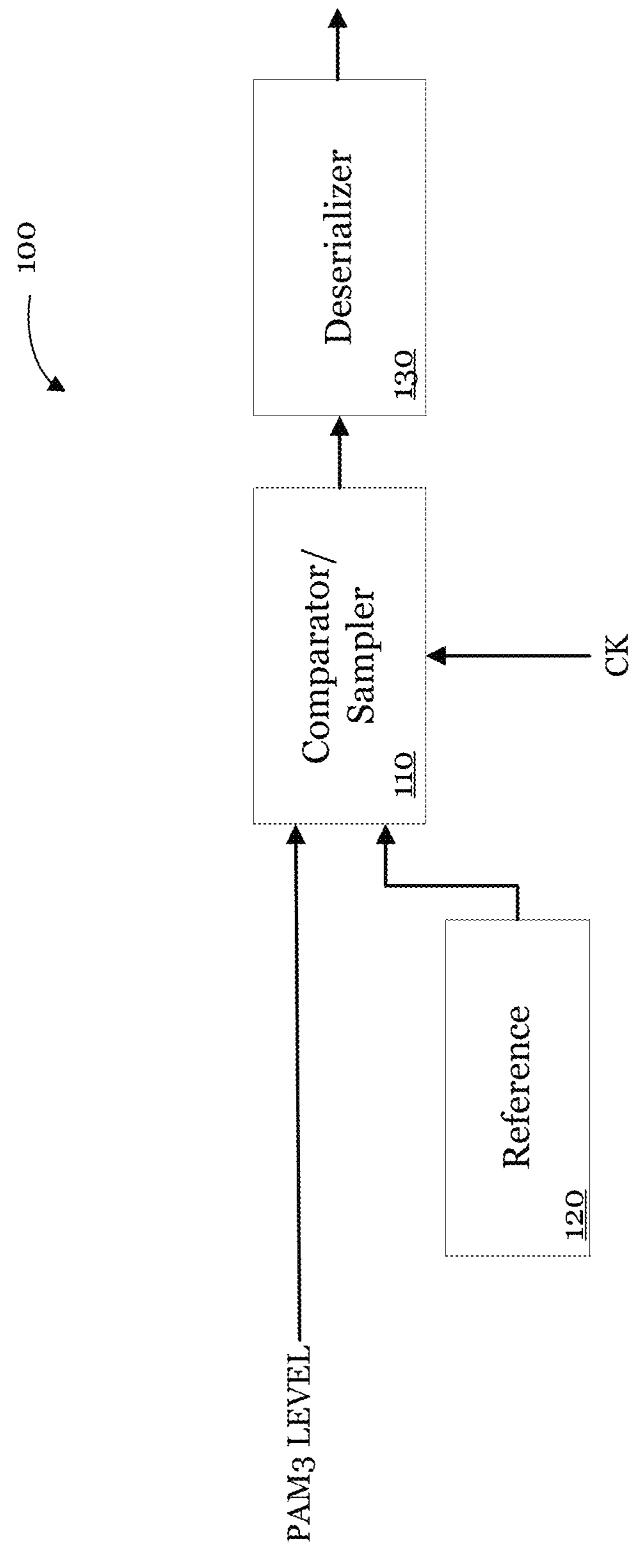
FIG. 1 illustrates an error sampling and decoding system according to some implementations.

Corresponding numerals and symbols in the different figures generally refer to corresponding parts unless otherwise indicated. The figures are drawn to clearly illustrate the relevant aspects of the implementations and are not necessarily drawn to scale. The edges of features drawn in the figures do not necessarily indicate the termination of the extent of the feature.

DETAILED DESCRIPTION OF ILLUSTRATIVE IMPLEMENTATIONS

The making and using of various implementations are discussed in detail below. It should be appreciated, however, that the various implementations described herein are applicable in a wide variety of specific contexts. The specific implementations discussed are merely illustrative of specific ways to make and use various implementations, and should not be construed in a limited scope. Unless specified otherwise, the expressions "about", "around", "approximately", "substantially", and other unspecifying terms signify within 10%, and preferably within 5% of the given value or, such as in the case of substantially zero, less than 10% and preferably less than 5% of a comparable quantity. Unless specified otherwise, the expressions "equal", "similar", "proportional", or other relational terms are understood to signify or include that the relation is substantially equal, substantially similar, substantially proportional, etc.

GDDR7 Error Receivers receive Data Error Information in PAM3 Levels. For example, in some implementations, a PAM3 positive 3 error signal level indicates no data error, a PAM3 zero error signal level indicates a CRC error, and a PAM3 negative 3 error signal level indicates both a CRC error and a parity error. For example, for a GDDR7 PAM3 address command error receiver, "NO DATA ERROR" information is encoded in the MSB bit. For example, when the T2B_OUT<1>=1, there is no data error, irrespective of the state of T2B_OUT<0>.

Current techniques directly sample incoming PAM3 signals, for example, without clock edge alignment, as no separate edge alignment training is used in GDDR7. Accordingly, current techniques over sample the incoming PAM3 error signal using a high speed clock. In addition, current techniques use two sampling circuits and subsequently use a majority voting type algorithm to decode the three level signal. These techniques accordingly use excessive power, and generate excessive kickback noise onto the PAM3 error signal because of the sampling.

Some implementations use an error sampling and decoding system which has a reference circuit that generates reference values, and a single comparator circuit that receives error symbols and generates serial error data representing the error symbols based on successive comparisons of the error symbols with the first and second reference values. Because the system uses a single comparator circuit the system uses less power and generates less kickback noise than traditional techniques. The system also has a deserializer circuit that generates parallel data corresponding with the error symbols based on the serial error data generated by the comparator circuit.

In some implementations, the error receiver directly samples the PAM3 level error signal without clock edge alignment for example using over sampling techniques. This practice is particularly advantageous as, in some implementations, GDDR7 does not support separate edge alignment training.

In some implementations, the error receiver uses two sampler circuits to reliably detect the three level PAM3 error signals with a high-speed clock signal to oversample the incoming error signals. The two sampler circuits may be arranged to provide the low power and low kickback noise of single comparator circuit implementations. In some implementations, a majority voting algorithm may be used to decode the error signal levels.

The implementations discussed herein overcome certain challenges in PAM3 level signal sampling to support error-free data transmission, for example, by using lower power and achieving lower kickback noise due to sampling.

In some implementations, the PAM3 level error signal is sampled using a Write Clock (WCK) rate clock, for example using either of the rising or falling edges of the WCK rate clock. After sampling, the 2 bit sampled data is deserialized, for example, to 16 Bits using, for example, two 1:8 deserializers.

In some implementations, a single sampler is used instead of the conventional two samplers. This results in improved area and power efficiency. In addition, because only a single sampler is used, kickback noise on the PAM3 signal is reduced.

In some implementations, a single deserializer circuit is used instead of the conventional two deserializer circuits. This results in improved area and power efficiency. In addition, because only a single deserializer circuit is used, clock load, clock power, and clock noise are reduced.

In some implementations, a sampler circuit uses a high-speed switchable reference source.

In some implementations, the PAM3 signal is in a high voltage I/O supply domain (VDDIO), and the high and low reference voltages are 0.85*VDDIO and 0.55*VDDIO, respectively.

In some implementations, the PAM3 signal levels are VDDIO (+3 Symbol), 0.7*VDDIO (o Symbol) and 0.4*VDDIO (−3 Symbol).

In some implementations, maximum VDDIO and VDD (Core Domain) supply voltages are 1.32V and 0.96V, respectively. In some implementations, the high and low reference voltages are 1.122V and 0.726V, respectively.

In some implementations, an analog pass gate multiplexer is used to switch between the high and low reference voltages. In some implementations, the reference voltage selected by the multiplexer is used as a negative input to a single sampler circuit, and the positive input of the single sampler circuit is the PAM3 signal. In some implementations, the analog pass gate multiplexer is formed using high-voltage devices, for example having a thick gate oxide. In some implementations, the analog pass gate multiplexer is controlled using low voltage core domain signals provided to a level shifter circuit.

In some implementations, input devices of the sampler circuit are high-voltage devices. In some implementations, other devices of the sampler circuit are low-voltage, core devices.

In some implementations, the multiplexing function is implemented using low-voltage switches in series with high-voltage input devices of the sampler circuit. This allows for fast switching, and isolates kickback noise onto the PAM3 input signal. In addition, this allows for low-voltage control of the multiplexing function, such that in some implementations, a level shifter circuit is not used.

In some implementations, an available timing margin for a next sampling operation using the other reference voltage allows for a WCK rate clock. This is significantly greater than the CLK-2-Q delay of some samplers (i.e., <2/WCK rate clock).

In some implementations, the sampler digital output is continuously static (either logic level 1 or 0) for +3 and −3 PAM3 symbols.

In some implementations, the sampler digital output toggles between logic levels 1 and 0, for '0' PAM3 symbols.

FIG. 1 illustrates an error sampling and decoding system 100 according to some implementations. Error sampling and decoding system 100 includes comparator/sampler circuit 110, reference circuit 120, and deserializer circuit 130. Error sampling and decoding system 100 is configured to receive error data, for example, having a three-level PAM3 format. In addition, error sampling and decoding system 100 generates, for example, two-bit, or four-bit parallel digital error data representing the three level PAM3 error data. The digital data may be transmitted, for example, to a controller configured to receive the error data and respond appropriately according to the error data as specified by, for example, the GDDR7 protocol or standard.

Some implementations have a single comparator/sampler circuit 110 that receives error symbols and generates serial error data representing the error symbols based on successive comparisons of the error symbols with the first and second reference values. Because the implementations use a single comparator circuit the system uses less power and generates less kickback noise than traditional techniques.

Comparator/sampler circuit 110 is configured to receive the three level PAM3 error data, and to receive reference information from reference circuit 120. In some implementations, comparator/sampler circuit 110 is also configured to receive a clock signal, and to generate two or more bits of serial data based on the three level PAM3 error data and the received reference information, where the serial data is synchronously generated based on the received clock signal.

For example, for each three level PAM3 error symbol received by comparator/sampler circuit 110, comparator/sampler circuit 110 performs at least two compare and sample operations. For example, during a first compare and sample operation, comparator/sampler circuit 110 may be configured to compare the received error symbol with a first reference value. In addition, during the first compare and sample operation, comparator/sampler circuit 110 generates a first bit of the serial data. In addition, during a second compare and sample operation, comparator/sampler circuit 110 may be configured to compare the received error symbol with a second reference value. In addition, during the second compare and sample operation, comparator/sampler circuit 110 is configured to generate a second bit of the generated serial data.

Nonlimiting examples of implementations of compare/sampler circuit 110 are discussed in further detail elsewhere herein.

Reference circuit 120 is configured to generate and provide the first and second reference values to compare/sampler circuit 110. In some implementations, reference circuit 120 is configured to continuously provide the first and second reference values to compare/sampler circuit 110. In some implementations, reference circuit 120 is configured to synchronously provide the first and second reference values to compare/sampler circuit 110. Nonlimiting examples of implementations of reference circuit 120 are discussed in further detail elsewhere herein.

Deserializer circuit 130 is configured to receive the first and second bits, and in some implementations, additional bits of the serial data generated for each PAM3 error symbol. In addition, deserializer circuit 130 is configured to generate parallel data corresponding with the PAM3 error symbols, and, for example, to transmit the parallel data to another circuit, such as a controller configured to perform operations based on the received parallel data, for example, in accordance with a GDDR7 protocol specification.

Figure 2:
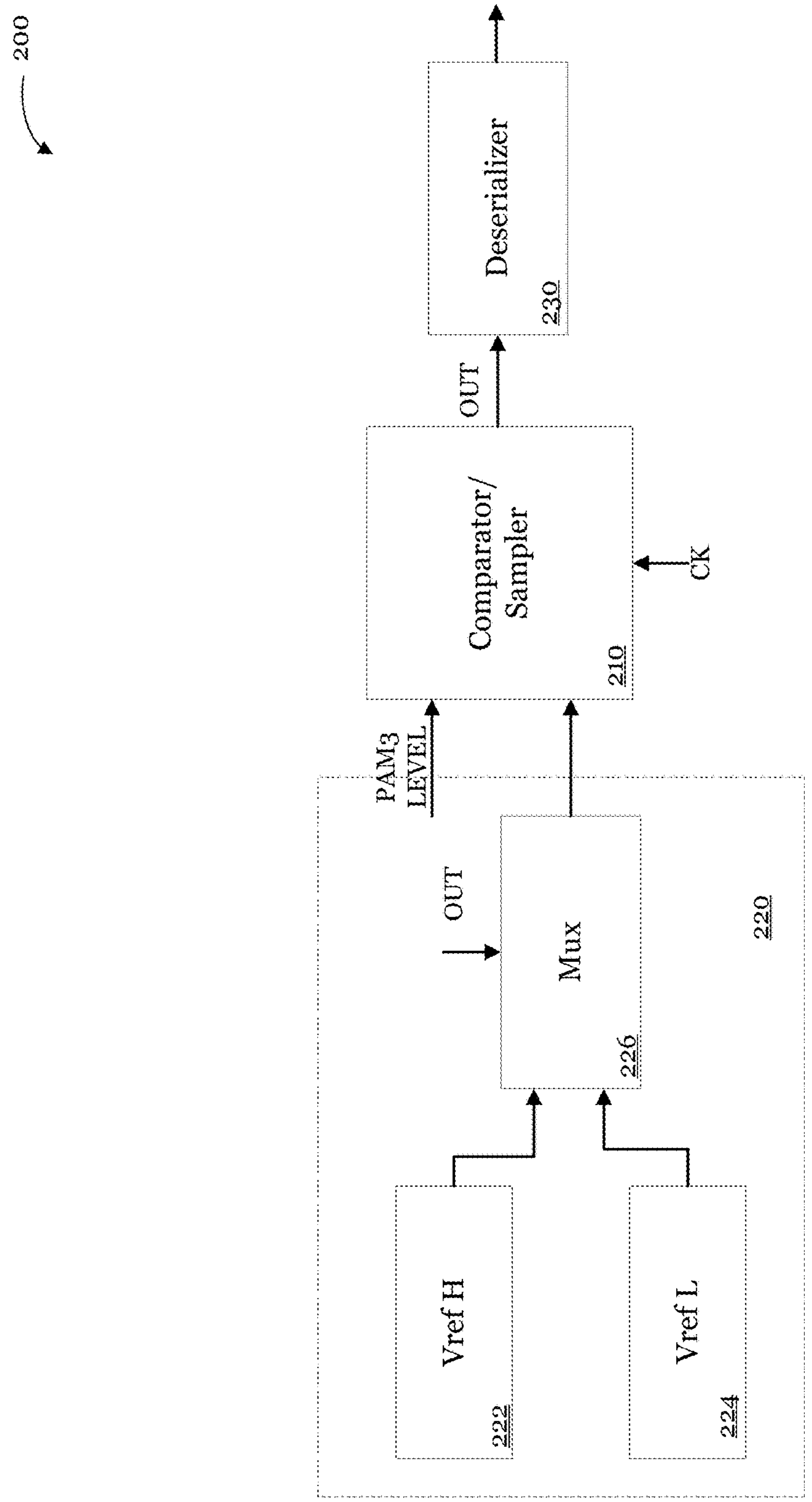
FIG. 2 illustrates an error sampling system according to some implementations.

FIG. 2 illustrates an error sampling and decoding system 200 according to some implementations. Error sampling and decoding system 200 includes comparator/sampler circuit 210, reference circuit 220, and deserializer circuit 230. Error sampling and decoding system 200 has features similar or identical to error sampling system and decoding system 100. For example, a sampling and decoding system 200 is configured to receive error data, for example, having a three-level PAM3 format, and to generate, for example, two-bit or four-bit parallel digital error data representing the three level PAM3 error data. The bit digital data may be transmitted, for example, to a controller configured to receive the error data and to respond appropriately according to the error data as specified by, for example, a GDDR7 protocol.

Comparator/sampler circuit 210 is configured to receive the PAM3 error symbols, and to receive reference information from reference circuit 220, to generate two or more bits of serial data based on each PAM3 error symbol and based on the received reference information. For example, during a first compare and sample operation, comparator/sampler circuit 210 may be configured to compare the received error symbol with a first reference value, and to generate a first bit of the serial data based on the first comparison at output OUT. In addition, during a second compare and sample operation, comparator/sampler circuit 210 may be configured to compare the received error symbol with a second reference value, and to generate a second bit of the generated serial data based on the second comparison at output OUT.

Reference circuit 220 is configured to generate and provide the first and second reference values to comparator/sampler circuit 210. Reference circuit 220 includes first and second reference generators 222 and 224. In addition, reference circuit 220 includes multiplexer circuit 226.

In the illustrated implementation, first reference generator 222 generates a first voltage reference and second reference generator 224 generates a second voltage reference, where the first voltage reference has a higher voltage than a voltage of the second voltage reference. In some implementations, the voltages of the voltage references correspond with threshold voltage levels of a protocol specification, such as GDDR7.

Multiplexer circuit 226 is configured to select either the first voltage reference or the second voltage reference according to the data at the output OUT of comparator/sampler circuit 210.

Accordingly, in operation, the result of the previous compare operation provides the input to multiplexer circuit 226 for the next compare operation. For example, if the previous compare operation of comparator/sampler circuit 210 generates a low bit at the output OUT, multiplexer circuit 226 selects the lower voltage reference of the second reference generator 224. Similarly, if the previous compare operation of comparator/sampler circuit 210 generates a high bit at the output OUT, multiplexer circuit 226 selects the higher voltage reference of the first reference generator 222.

Deserializer circuit 230 may have features similar or identical to deserializer circuit 130 of FIG. 1. For example, deserializer circuit 230 may be configured to receive the first and second bits and any other bits of the serial data generated for each PAM3 error symbol. In addition, deserializer circuit 230 may be configured to generate parallel data corresponding with the PAM3 error symbols, and to transmit the parallel data to another circuit, such as a controller configured to perform operations based on the received parallel data, for example, in accordance with a GDDR7 protocol specification.

Figure 3:
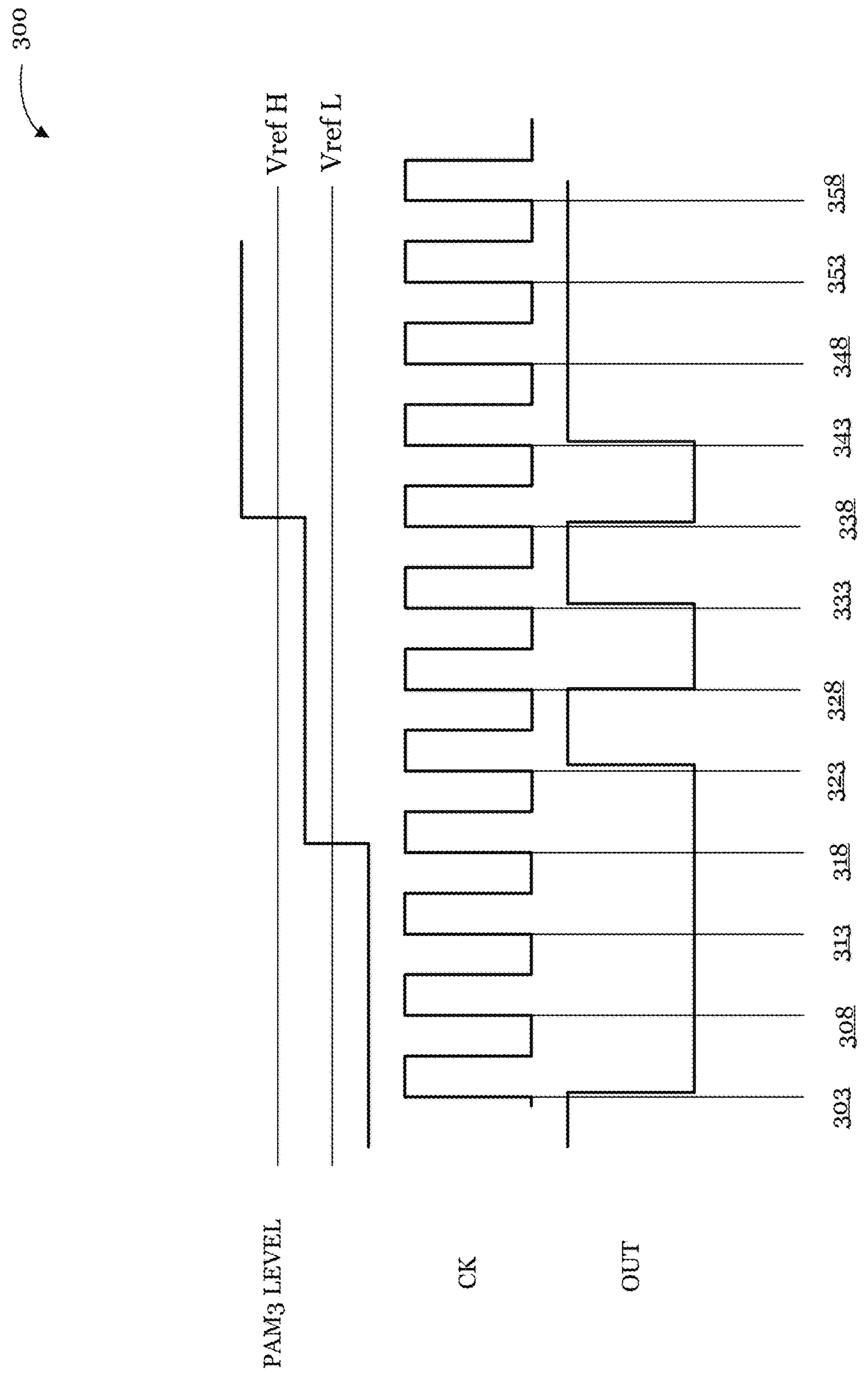
FIG. 3 illustrates a waveform diagram of the operation of the error sampling system of FIG. 2 according to some implementations.

FIG. 3 illustrates a waveform diagram 300 of the operation of the error sampling and decoding system 200 of FIG. 2 according to some implementations. Waveform diagram 300 shows the operation of error sampling and decoding system 200 for three PAM3 error symbols. In addition, during each of the three PAM3 error symbols, the error sampling and decoding system 200 receives four periods of the input clock CK.

During a first portion of the illustrated operation, the PAM3 error symbol has a low value.

At rising edge 303 of input clock CK, because the output OUT is high, comparator/sampler circuit 210 compares the error data with the Vref H threshold. Because the error data is less than the Vref H threshold, shortly after the rising edge 303, the output OUT becomes low.

At rising edges 308, 313, and 318 of input clock CK, because the output OUT is low, comparator/sampler circuit 210 compares the error data with the Vref L threshold. Because the error data is less than the Vref L threshold, shortly after the rising edges 308, 313, and 318, the output OUT remains low.

During a second portion of the illustrated operation, the PAM3 error symbol has a zero value.

At rising edge 323 of input clock CK, because the output OUT is low, comparator/sampler circuit 210 compares the error data with the Vref L threshold. Because the error data is greater than the Vref L threshold, shortly after the rising edge 323, the output OUT becomes high.

At rising edge 328 of input clock CK, because the output OUT is high, comparator/sampler circuit 210 compares the error data with the Vref H threshold. Because the error data is less than the Vref H threshold, shortly after the rising edge 328, the output OUT becomes low.

At rising edge 333 of input clock CK, because the output OUT is low, comparator/sampler circuit 210 compares the error data with the Vref L threshold. Because the error data is greater than the Vref L threshold, shortly after the rising edge 333, the output OUT becomes high.

At rising edge 338 of input clock CK, because the output OUT is high, comparator/sampler circuit 210 compares the error data with the Vref H threshold. Because the error data is less than the Vref H threshold, shortly after the rising edge 338, the output OUT becomes low.

During a third portion of the illustrated operation, the PAM3 error symbol has a high value.

At rising edge 343 of input clock CK, because the output OUT is low, comparator/sampler circuit 210 compares the error data with the Vref L threshold. Because the error data is greater than the Vref L threshold, shortly after the rising edge 343, the output OUT becomes high.

At rising edges 348, 353, and 358 of input clock CK, because the output OUT is high, comparator/sampler circuit 210 compares the error data with the Vref H threshold. Because the error data is greater than the Vref H threshold, shortly after the rising edges 348, 353, and 358, the output OUT remains high.

As illustrated, in this implementation, comparator/sampler circuit 210 generates four bits for each error symbol. If the error symbol is the PAM3 low value, all four bits generated by comparator/sampler circuit 210 are low. In addition, if the error symbol is the PAM3 high value, all four bits generated by comparator/sampler circuit 210 are high.

Furthermore, if the error symbol is the PAM3 zero value, two of the four bits are low and two of the four bits are high. In the illustrated example, the first and third bits of the four bits corresponding with the PAM3 zero value are high, and the second and fourth bits of the four bits corresponding with the PAM3 zero value are low. In the implementation of FIG. 2, this occurs as a consequence of the previous error symbol having a PAM3 low value. Accordingly, in the implementation of FIG. 2, the four bits of a PAM3 zero value preceded by a PAM3 high value would have the first and third bits as low, and would have the second and fourth bits as high. Furthermore, in the implementation of FIG. 2, the four bits of a PAM3 zero value preceded by a PAM3 zero value would have the same four-bit sequence as the four bits of the preceding PAM3 zero value.

In some implementations of FIG. 2, deserializer circuit 230 is configured to receive the four bits for each PAM3 symbol and to convert the four bits into a four-bit parallel word. For example, in some implementations, deserializer circuit 230 is configured to receive four low bits from comparator/sampler circuit 210, and to generate a four-bit 0000 word for a controller, where the controller is configured to recognize the 0000 word as corresponding with the PAM3 low level error symbol. Similarly, in some implementations, deserializer circuit 230 is configured to receive four high bits from comparator/sampler circuit 210, and to generate a four-bit 1111 word for the controller, where the controller is configured to recognize the 1111 word as corresponding with the PAM3 high level error symbol. In some implementations, deserializer circuit 230 is configured to receive a 1010 four-bit sequence from comparator/sampler circuit 210, and to generate a four-bit 1010 word for the controller, where the controller is configured to recognize the 1010 word as corresponding with the PAM3 zero level error symbol. In some implementations, deserializer circuit 230 is configured to receive a 0101 four-bit sequence from comparator/sampler circuit 210, and to generate a four-bit 0101 word for the controller, where the controller is configured to recognize the 0101 word as corresponding with the PAM3 zero level error symbol. In some implementations, the controller is configured to respond to a four-bit 0101 word and to respond to a four-bit 1010 word identically.

In some implementations, deserializer circuit 230 is configured to receive the four bits for each of a plurality of PAM3 symbols and to convert the four bits of each PAM3 error symbol into a portion of an eight bit parallel word.

Figure 4:
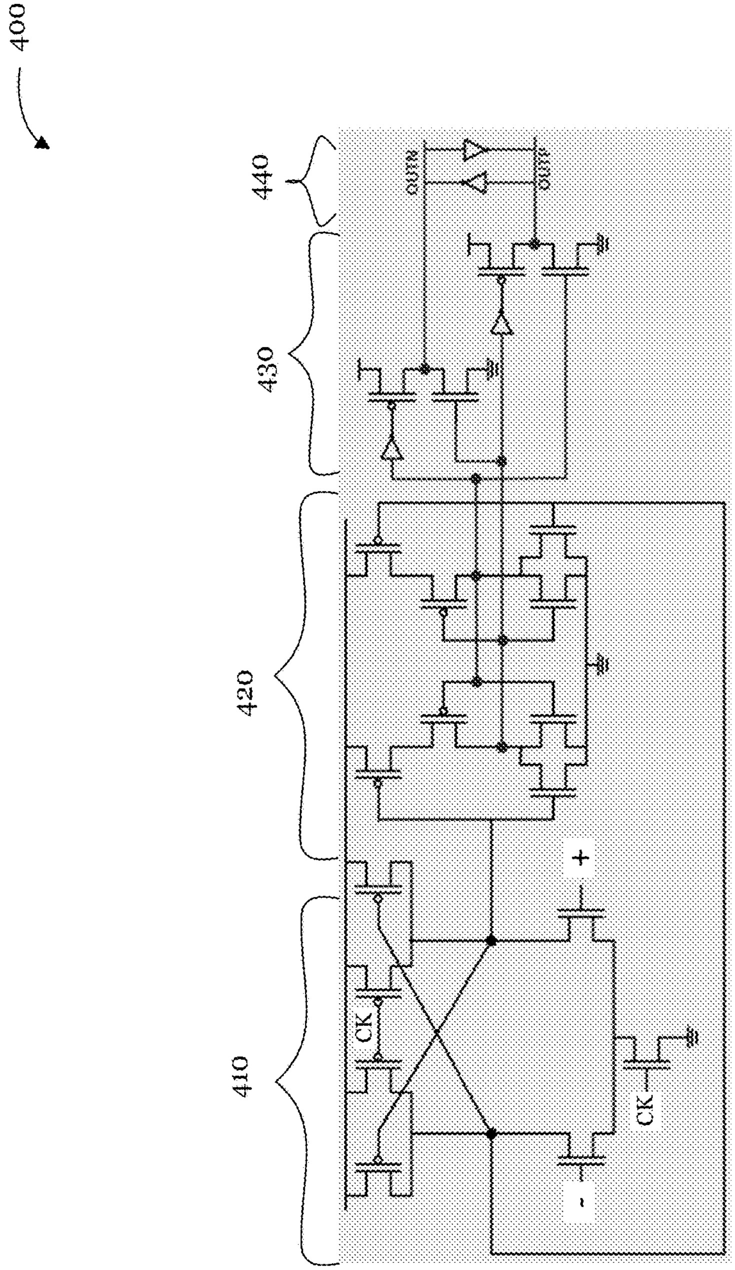
FIG. 4 illustrates a comparator/sampler circuit according to some implementations.

FIG. 4 illustrates a comparator/sampler circuit 400 according to some implementations. Comparator/sampler circuit 400 may be used as comparator/sampler circuit 210 of FIG. 2. In alternative implementations, a comparator/sampler circuit having features similar or identical to comparator/sampler circuit 400 may be used as comparator/sampler circuit 210 of FIG. 2. The illustrated topology is an example only. Numerous other circuit topologies and techniques may be used.

In the illustrated implementation, comparator/sampler circuit 400 includes dual tail sampler employing comparator stage 410, strong arm latch stage 420, SR output latch comprising buffer stage 430 and output latch 440.

Comparator stage 410 is clocked, such that during a positive phase of the clock signal, a difference in voltages of the positive and negative inputs is amplified as a differential output signal of the comparator stage 410. During a negative phase of the clock signal, the differential output signals are pre-charged to a core supply voltage at the output of the comparator stage 410. In alternative implementations, other topologies may be used.

In the illustrated example, strong arm latch stage 420 comprises cross-coupled NOR gates configured to receive the differential output signal of the comparator stage 410 as a differential input. In alternative implementations, other topologies may be used.

In the illustrated example, buffer stage 430 comprises a differential buffer circuit configured to receive the differential output generated by latch stage 420, and to generate a high current drive differential signal for output latch 440. In alternative implementations, other topologies may be used.

In the illustrated example, output latch 440 comprises cross-coupled inverters. In alternative implementations, other topologies may be used.

Figure 5:
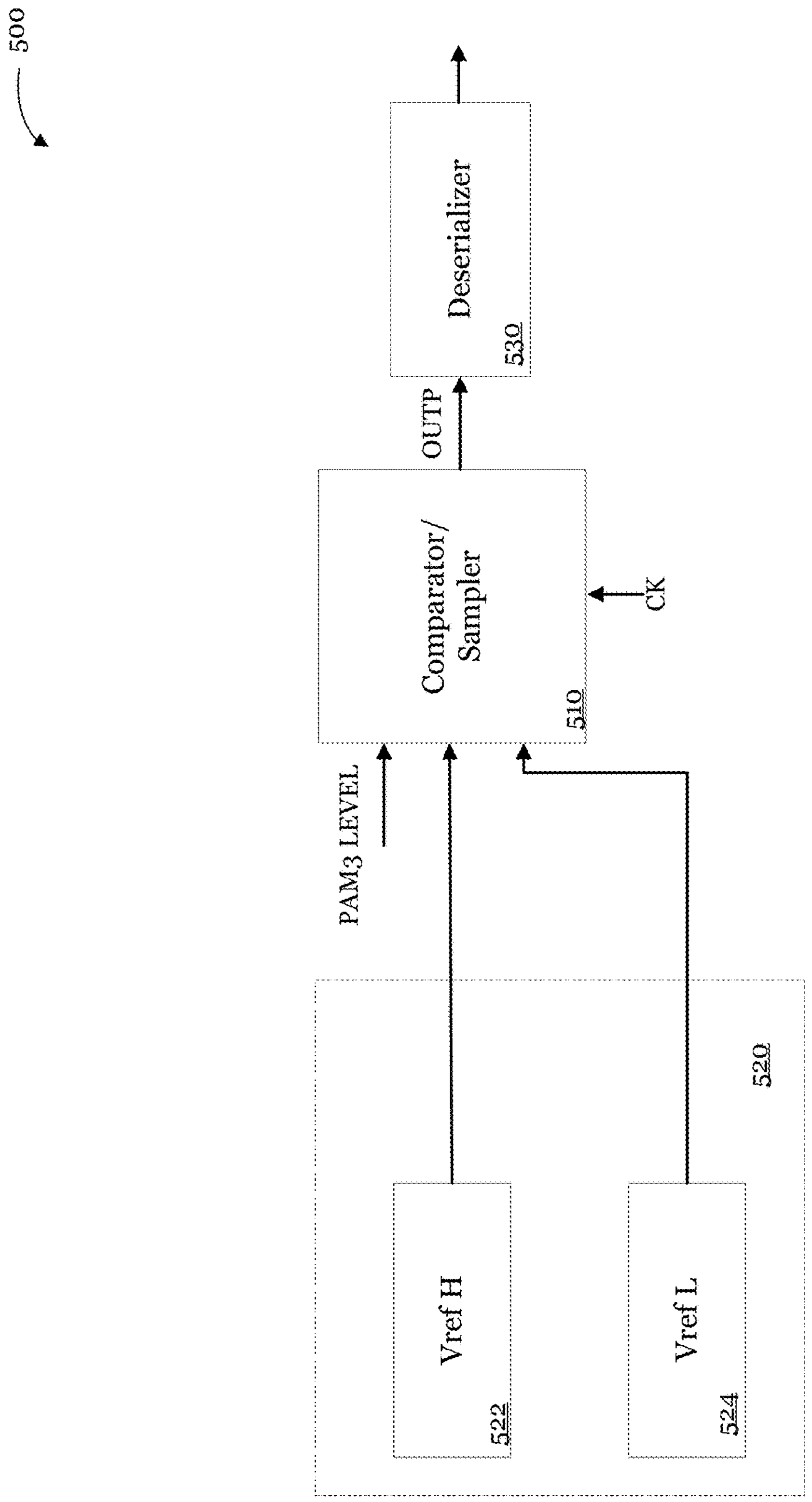
FIG. 5 illustrates an error sampling and decoding system according to some implementations.

FIG. 5 illustrates an error sampling and decoding system 500 according to some implementations. Error sampling and decoding system 500 includes comparator/sampler circuit 510, reference circuit 520, and deserializer circuit 530. Error sampling and decoding system 500 has features similar or identical to error sampling system and decoding system 100. For example, a sampling and decoding system 500 is configured to receive error data, for example, having a three-level PAM3 format, and to generate, two-bit or four-bit parallel digital error data representing the three level PAM3 error data. The digital data may be transmitted, for example, to a controller configured to receive the error data and to respond appropriately according to the error data as specified by, for example, a GDDR7 protocol.

Comparator/sampler circuit 510 is configured to receive the PAM3 error symbols, and to receive reference information from reference circuit 520, to generate two or more bits of serial data based on each PAM3 error symbol and based on the received reference information. For example, during a first compare and sample operation, comparator/sampler circuit 510 may be configured to compare the received error symbol with a first reference value, and to generate a first bit of the serial data based on the first comparison at output OUT. In addition, during a second compare and sample operation, comparator/sampler circuit 510 may be configured to compare the received error symbol with a second reference value, and to generate a second bit of the generated serial data based on the second comparison at output OUT.

Reference circuit 520 is configured to generate and provide the first and second reference values to comparator/sampler circuit 510. Reference circuit 520 includes first and second reference generators 522 and 524.

In the illustrated implementation, first reference generator 522 generates a first voltage reference and second reference generator 524 generates a second voltage reference, where the first voltage reference has a higher voltage than a voltage of the second voltage reference. In some implementations, the voltages of the voltage references correspond with threshold voltage levels of a protocol specification, such as GDDR7.

Deserializer circuit 530 may have features similar or identical to deserializer circuit 130 of FIG. 1. For example, deserializer circuit 530 may be configured to receive the first and second bits of the serial data generated for each PAM3 error symbol. In addition, deserializer circuit 530 may be configured to generate parallel data corresponding with the PAM3 error symbols, and to transmit the parallel data to another circuit, such as a controller configured to perform operations based on the received parallel data, for example, in accordance with a GDDR7 protocol specification.

Figure 6:
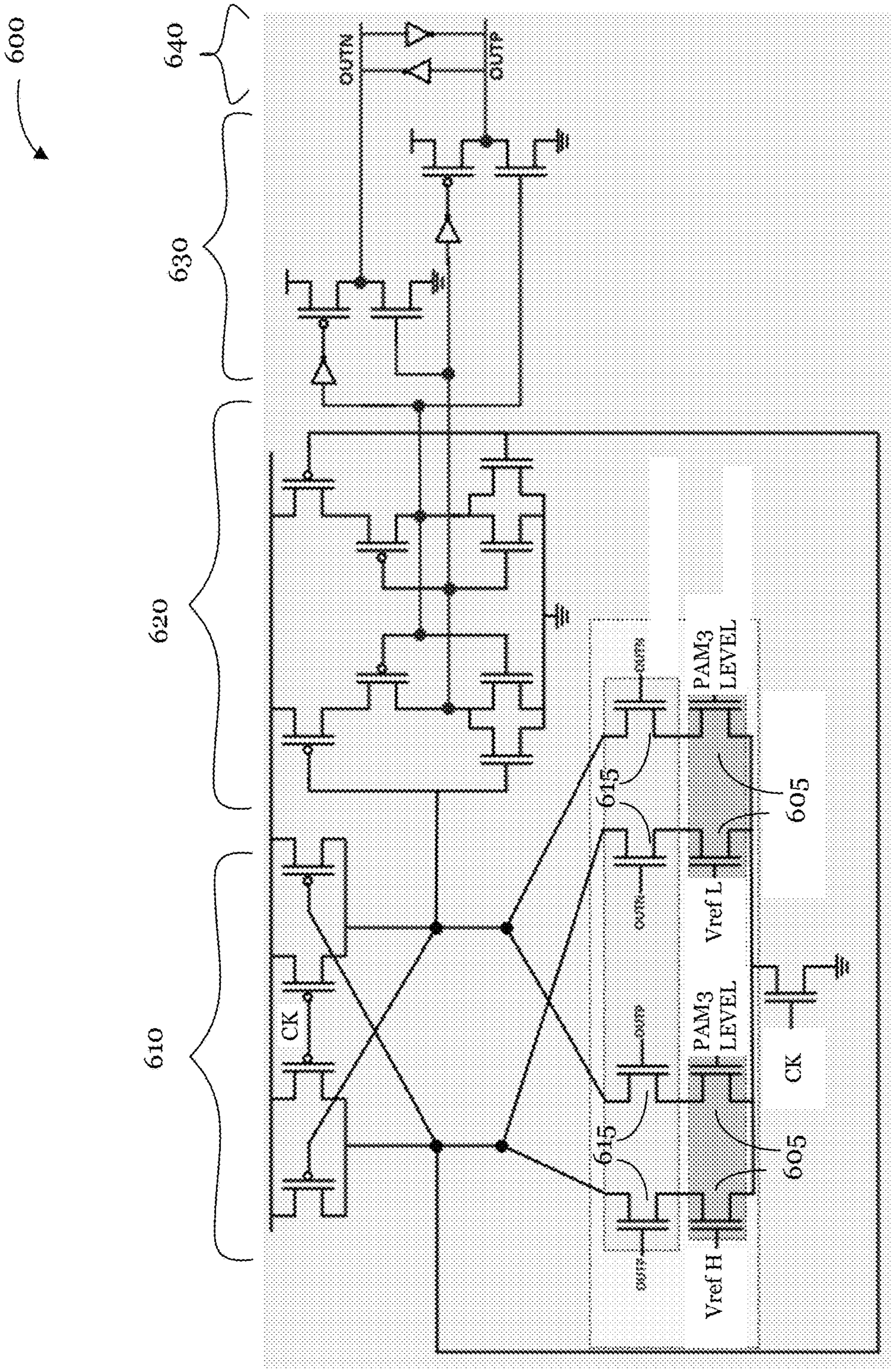
FIG. 6 illustrates a comparator/sampler circuit according to some implementations.

FIG. 6 illustrates a comparator/sampler circuit 600 according to some implementations. Comparator/sampler circuit 600 may be used as comparator/sampler circuit 510 of FIG. 5. In alternative implementations, a comparator/sampler circuit having features similar or identical to comparator/sampler circuit 600 may be used as comparator/sampler circuit 510 of FIG. 5. The illustrated topology is an example only. Numerous other circuit topologies and techniques may be used.

In the illustrated implementation, comparator/sampler circuit 600 includes multiplexing comparator stage 610, strong arm latch stage 620, an SR latch comprising buffer stage 630, and output latch 640.

Multiplexing comparator stage 610 is clocked, such that during a positive phase of the clock signal, a difference in voltages of the error data and one of the reference voltages is amplified as a differential output signal of the multiplexing comparator stage 610. Which of the reference voltages is compared with the error data is determined by the result of the previous comparison, as discussed in more detail below. Furthermore, during negative phase of the clock signal, the differential output signals are pre-charged to a core supply voltage at the output of the multiplexing comparator stage 610. In alternative implementations, other topologies may be used.

In some implementations, the NMOS transistors 605 directly connected to the clocked NMOS transistors are high-voltage devices, having, for example, a relatively thick gate oxide. In some implementations, the NMOS transistors

615 directly connected to the NMOS transistors 605 are low-voltage devices, having, for example, a relatively thin gate oxide.

In the illustrated example, strong arm latch stage 620 comprises cross-coupled NOR gates configured to receive the differential output signal of the multiplexing comparator stage 610 as a differential input. In alternative implementations, other topologies may be used.

In the illustrated example, buffer stage 630 comprises a differential buffer circuit configured to receive the differential output generated by strong arm latch stage 620, and to generate a high current drive differential signal for output latch 640. In alternative implementations, other topologies may be used.

In the illustrated example, output latch 640 comprises cross-coupled inverters. In alternative implementations, other topologies may be used.

Accordingly, in operation, the result of the previous compare operation at output latch 640 provides an input to multiplexing comparator stage 610 for the next compare operation. For example, if the previous compare operation of comparator/sampler circuit 600 generates a low level at the output OUTP and a high level at the output OUTN, multiplexing comparator stage 610 compares the current error symbol with the lower voltage reference Vref L. Similarly, if the previous compare operation of comparator/sampler circuit 600 generates a high level at the output OUTP and a low level at the output OUTN, multiplexing comparator stage 610 compares the current error symbol with the higher voltage reference Vref H.

Figure 7:
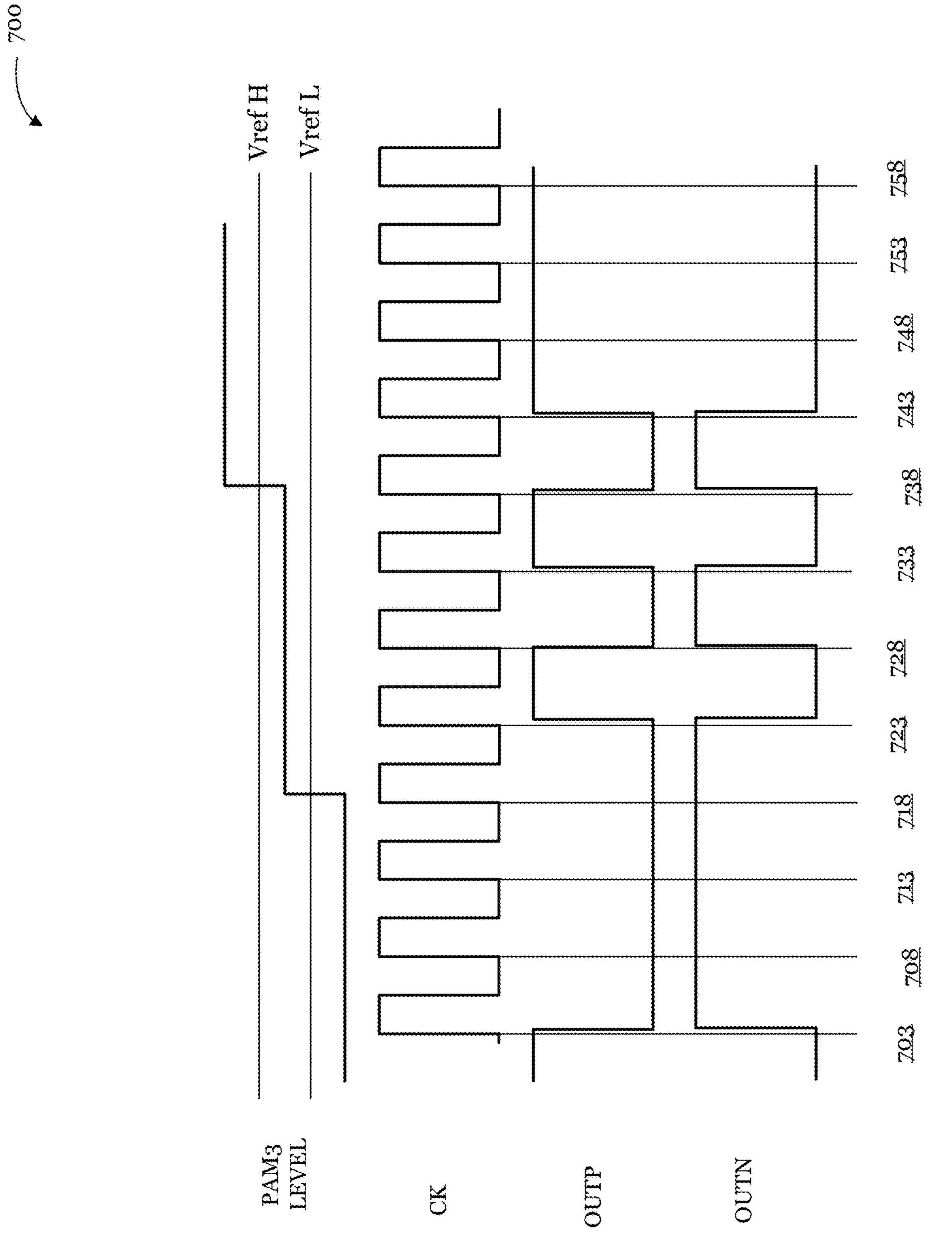
FIG. 7 illustrates a waveform diagram of the operation of the error sampling system of FIG. 5 according to some implementations.

FIG. 7 illustrates a waveform diagram 700 of the operation of the error sampling and decoding system 500 of FIG. 5 using comparator/sampler circuit 600 of FIG. 6 according to some implementations. Waveform diagram 700 shows the operation of error sampling and decoding system 500 using comparator/sampler circuit 600 for three PAM3 error symbols. In addition, during each of the three PAM3 error symbols, the error sampling and decoding system 500 receives four periods of the input clock CK.

During a first portion of the illustrated operation, the PAM3 error symbol has a low value.

At rising edge 703 of input clock CK, because the output OUTP of comparator/sampler circuit 600 is high and the output OUTN of comparator/sampler circuit 600 is low, comparator/sampler circuit 510 compares the error data with the Vref H threshold. Because the error data is less than the Vref H threshold, shortly after the rising edge 703, the output OUTP becomes low and the output OUTN becomes high.

At rising edges 708, 713, and 718 of input clock CK, because the output OUTP is low and the output OUTN is high, comparator/sampler circuit 510 compares the error data with the Vref L threshold. Because the error data is less than the Vref L threshold, shortly after the rising edges 708, 713, and 718, the output OUTP remains low and the output OUTN remains high.

During a second portion of the illustrated operation, the PAM3 error symbol has a zero value.

At rising edge 723 of input clock CK, because the output OUTP is low and the output OUTN is high, comparator/sampler circuit 510 compares the error data with the Vref L threshold. Because the error data is greater than the Vref L threshold, shortly after the rising edge 723, the output OUTP becomes high and the output OUTN becomes low.

At rising edge 728 of input clock CK, because the output OUTP is high and the output OUTN is low, comparator/sampler circuit 510 compares the error data with the Vref H threshold. Because the error data is less than the Vref H threshold, shortly after the rising edge 728, the output OUTP becomes low and the output OUTN becomes high.

At rising edge 733 of input clock CK, because the output OUTP is low and the output OUTN is high, comparator/sampler circuit 510 compares the error data with the Vref L threshold. Because the error data is greater than the Vref L threshold, shortly after the rising edge 733, the output OUTP becomes high and the output OUTN becomes low.

At rising edge 738 of input clock CK, because the output OUTP is high and the output OUTN is low, comparator/sampler circuit 510 compares the error data with the Vref H threshold. Because the error data is less than the Vref H threshold, shortly after the rising edge 738, the output OUTP becomes low and the output OUTN becomes high.

During a third portion of the illustrated operation, the PAM3 error symbol has a high value.

At rising edge 743 of input clock CK, because the output OUTP is low and the output OUTN is high, comparator/sampler circuit 510 compares the error data with the Vref L threshold. Because the error data is greater than the Vref L threshold, shortly after the rising edge 743, the output OUTP becomes high and the output OUTN becomes low.

At rising edges 748, 753, and 758 of input clock CK, because the output OUTP is high, comparator/sampler circuit 510 compares the error data with the Vref H threshold. Because the error data is greater than the Vref H threshold, shortly after the rising edges 748, 753, and 758, the output OUTP remains high and the output OUTN remains low.

As illustrated, in this implementation, comparator/sampler circuit 510 generates four bits for each error symbol at output OUTP. If the error symbol is the PAM3 low value, all four bits generated by comparator/sampler circuit 510 are low. In addition, if the error symbol is the PAM3 high value, all four bits generated by comparator/sampler circuit 510 are high.

Furthermore, if the error symbol is the PAM3 zero value, two of the four bits are low and two of the four bits are high. In the illustrated example, the first and third bits of the four bits corresponding with the PAM3 zero value are high, and the second and fourth bits of the four bits corresponding with the PAM3 zero value are low. In the implementation of FIG. 5, this occurs as a consequence of the previous error symbol having a PAM3 low value. Accordingly, in the implementation of FIG. 5, the four bits of a PAM3 zero value preceded by a PAM3 high value would have the first and third bits as low, and would have the second and fourth bits as high. Furthermore, in the implementation of FIG. 5, the four bits of a PAM3 zero value preceded by a PAM3 zero value would have the same four-bit sequence as the four bits of the preceding PAM3 zero value.

In some implementations of FIG. 5, deserializer circuit 530 is configured to receive the four bits for each PAM3 symbol at output OUTP and to convert the four bits into a four-bit parallel word. For example, in some implementations, deserializer circuit 530 is configured to receive four low bits from comparator/sampler circuit 510, and to generate a four-bit 0000 word for a controller, where the controller is configured to recognize the 0000 word as corresponding with the PAM3 low level error symbol. Similarly, in some implementations, deserializer circuit 530 is configured to receive four high bits from comparator/sampler circuit 510, and to generate a four-bit 1111 word for the controller, where the controller is configured to recognize the 1111 word as corresponding with the PAM3 high level error symbol. In some implementations, deserializer circuit 530 is configured to receive a 1010 four-bit sequence from comparator/sampler circuit 510, and to generate a four-bit 1010 word for the controller, where the controller is configured to recognize the 1010 word as corresponding with the PAM3 zero level error symbol. In some implementations, deserializer circuit 530 is configured to receive a 0101 four-bit sequence from comparator/sampler circuit 510, and to generate a four-bit 0101 word for the controller, where the controller is configured to recognize the 0101 word as corresponding with the PAM3 zero level error symbol. In some implementations, the controller is configured to respond to a four-bit 0101 word and to respond to a four-bit 1010 word identically.

In some implementations, deserializer circuit 530 is configured to receive the four bits for each of a plurality of PAM3 symbols and to convert the four bits of each PAM3 error symbol into a portion of an eight bit parallel word.

Figure 8:
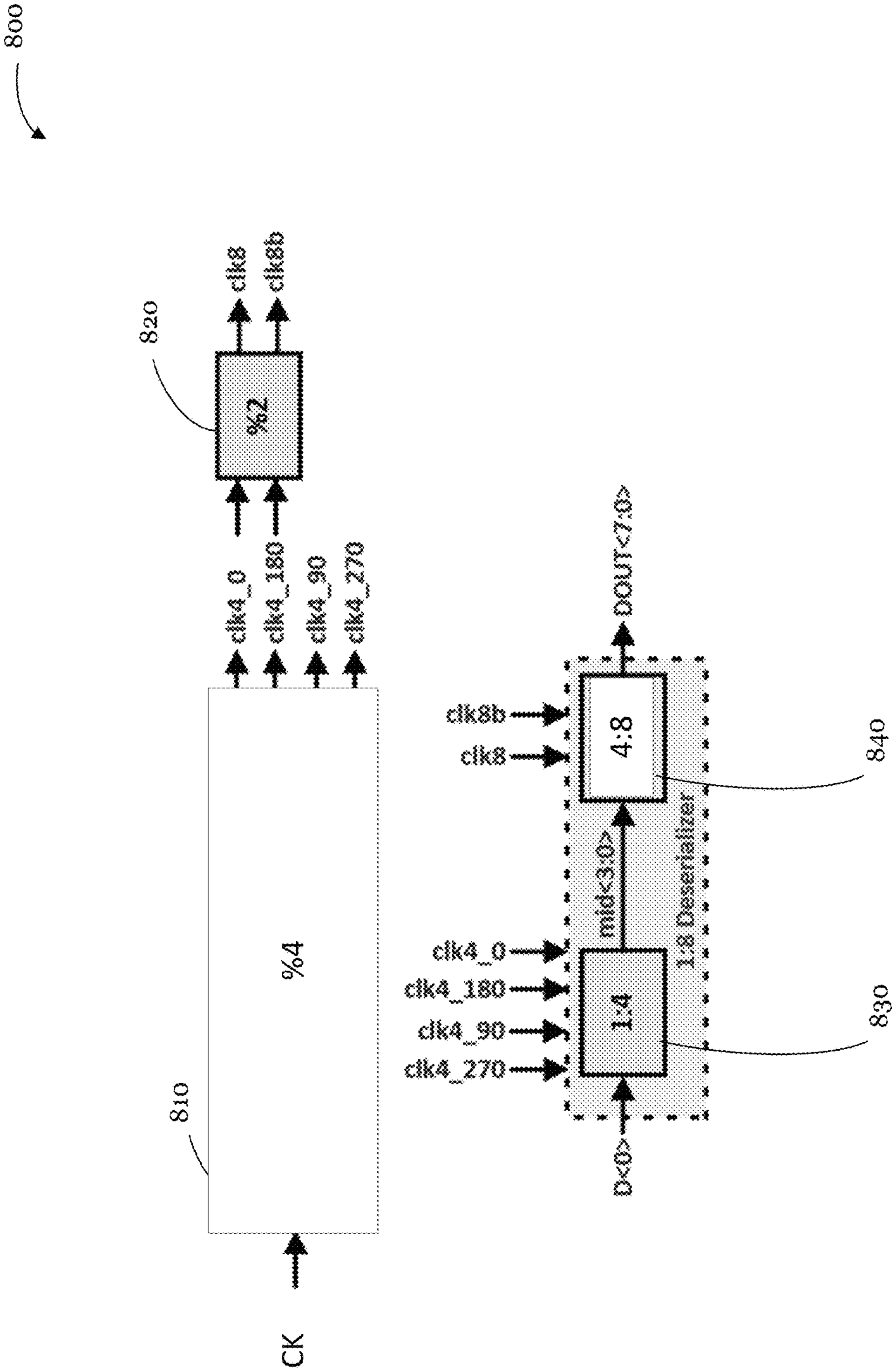
FIG. 8 illustrates a deserializer circuit according to some implementations.

FIG. 8 illustrates a deserializer circuit 800 according to some implementations. Deserializer circuit 800 may be used as deserializer circuit 130, deserializer circuit 230, and/or deserializer circuit 530. Other deserializer circuit topologies may alternatively be used, for example, having features similar or identical to deserializer circuit 800.

Deserializer circuit 800 includes divide by 4 clock divider 810, divide by 2 clock divider 820, one to four-bit deserializer 830, and four to eight bit deserializer 840.

Divide by 4 clock divider 810 receives input clock CK, and generates four 90-degree clocks clk4_0, clk4_180, clk4_90, and clk4_270 separated by about 90° in phase and each having one fourth the frequency of input clock CK. Divide by 2 clock divider 820 receives two of the 90° output clocks separated by 180° in phase, and generates inverted output clocks clk8 and clk8b having one eighth the frequency of input clock CK.

Four-bit deserializer 830 receives serial data corresponding with PAM3 error symbols, and generates four-bit words using 90-degree clocks clk4_0, clk4_180, clk4_90, and clk4_270, where each four-bit word corresponds with one PAM3 error symbol. Any deserializer architecture may be used.

Four to eight bit deserializer 840 receives four-bit words from four-bit deserializer 830, and generates an 8-bit word based on each pair of four-bit words using output clocks clk8 and clk8b. Accordingly, each 8-bit word corresponds with two PAM3 error symbols. Any deserializer architecture may be used.

Figure 9:
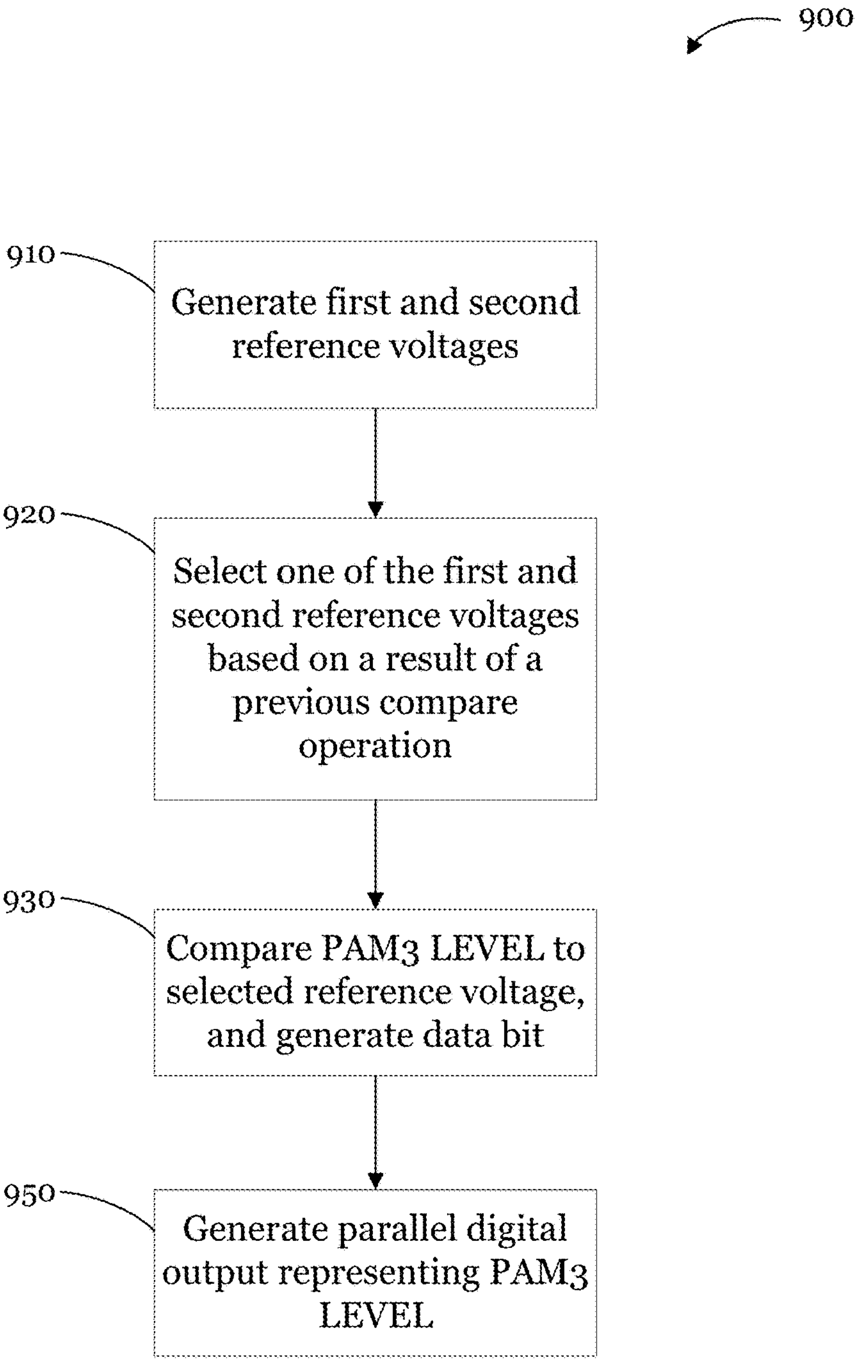
FIG. 9 illustrates a flowchart diagram of the operation of an error sampling and decoding system according to some implementations.

FIG. 9 illustrates a flowchart diagram of a method 900 of operating an error sampling and decoding system according to some implementations. Method 900 may be performed, for example, by any of the error sampling and decoding systems discussed herein. In addition, the error sampling and decoding systems discussed herein may perform other methods, for example, having aspects similar or identical to that of method 900.

At block 910, first and second reference voltages are generated. For example, reference voltage generator circuits may be used to generate the first and second reference voltages. In some implementations, the reference voltage generator circuits are configured to continuously provide the first and second reference voltages, for example, to a comparator/sampler circuit. In some implementations, the reference voltage generator circuits are configured to synchronously provide the first and second reference voltages to, for example, a comparator/sampler circuit.

At block 920, one of the first and second reference voltages is selected. For example, based on a result of a previous compare operation, one of the first and second reference voltages is selected for use in a current compare operation. In some implementations, a higher of the first reference value and the second reference value is selected for use in a current compare operation in response to the result of the previous compare operation indicating that the error symbol was greater than the previously selected first or second reference value.

At block 930, the error symbol is compared with the selected reference voltage. For example, during compare and sample operation, the comparator/sampler circuit may be configured to compare the error symbol with the selected reference voltage.

In addition, at block 930, a data bit is generated based on a result of the comparison operation. For example, in response to the error symbol being greater than the selected reference voltage, the data bit is generated having a first bit value, and, in response to the error symbol being less than the selected reference voltage, the data bit is generated having a second bit value, where the first and second bit values have opposite polarity.

In some implementations, each error symbol is oversampled. For example, in some implementations, each error symbol is compared multiple times with each of the first and second reference voltages, where each comparison generates an additional data bit.

Method 900 proceeds to block 950, where a multibit word is generated, for example by a deserializer circuit, where the multibit word represents one or more error symbols.

One general aspect is an error sampling and decoding system, including a reference circuit configured to generate first and second reference values; a comparator configured to receive a first error symbol, and to generate serial error data representing the first error symbol based on successive comparisons of the first error symbol with the first and second reference values; and a deserializer circuit configured to generate parallel data corresponding with the first error symbol based on the serial error data.

Implementations may include one or more of the following features. The error sampling and decoding system, where the comparator is configured to compare the first error symbol to a selected one of the first reference value and the second reference value. The error sampling and decoding system, where the comparator is configured to select the selected one of the first reference value and the second reference value for use in a current compare operation based on a result of a previous compare operation. The error sampling and decoding system, where the comparator is configured to select a higher of the first reference value and the second reference value for use in a current compare operation in response to the result of the previous compare operation indicating that the first error symbol was greater than the previously selected first or second reference value. The error sampling and decoding system, further including a multiplexer configured to select the selected one of the first reference value and the second reference value for use in a current compare operation based on a result of a previous compare operation. The error sampling and decoding system, where the multiplexer is configured to select a higher of the first reference value and the second reference value for use in a current compare operation in response to the result of the previous compare operation indicating that the first error symbol was greater than the previously selected first or second reference value. The error sampling and decoding system, where the first error symbol has a three-level format. The error sampling and decoding system, where the system conforms with a graphics double data rate 7 (GDDR7) standard. The error sampling and decoding system, where the comparator is configured to receive a second error symbol, and to generate additional serial error data representing the second error symbol based on successive comparisons of the second error symbol with the first and second reference values, and where the deserializer circuit is configured to generate the parallel data corresponding with both the first error symbol and the second error symbol based on the serial error data representing the first error symbol and based on the additional serial error data representing the second error symbol.

Another general aspect is a comparator sampler circuit, including a comparator stage configured to generate serial error data representing a first error symbol based on successive comparisons of the first error symbol with selected first and second reference values, where the selected first and second reference values are selected based on a result of a previous compare operation.

Implementations may include one or more of the following features. The comparator sampler circuit, where the comparator stage is configured to select the selected first and second reference values. The comparator sampler circuit, where the comparator stage is configured to select a higher of the first and second reference values for use in a current compare operation in response to a result of a previous compare operation indicating that the first error symbol was greater than the previously selected first or second reference value. The comparator sampler circuit, where the first and second reference values selected are selected by a multiplexer circuit. The comparator sampler circuit, where the multiplexer circuit is configured to select a higher of the first and second reference values for use in a current compare operation in response to a result of a previous compare operation indicating that the first error symbol was greater than the previously selected first or second reference value. The comparator sampler circuit, the first error symbol has a three-level format. The comparator sampler circuit, where the system conforms with a graphics double data rate 7 (GDDR7) standard.

Another general aspect is a method of using a comparator sampler circuit, the method including generating serial error data representing a first error symbol based on successive comparisons of the first error symbol with selected first and second reference values; and successively selecting the first and second reference values based on a result of a previous compare operation.

Implementations may include one or more of the following features. The method, where successively selecting the first and second reference values includes selecting a higher of the first and second reference values for use in a current compare operation in response to a result of a previous compare operation indicating that the first error symbol was greater than the previously selected first or second reference value. The method, where the first and second reference values selected are selected by a multiplexer circuit. The method, where the first and second reference values selected are selected by a comparator/sampler circuit.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. An error sampling and decoding system, comprising:
- a reference circuit configured to generate first and second reference values;
- a single comparator configured to receive a first error symbol, and to generate serial error data representing the first error symbol based on successive comparisons of the first error symbol with the first and second reference values, wherein the comparator is configured to compare the first error symbol to a selected one of either the first reference value or the second reference value that is selected based on a result of a previous compare operation; and
- a deserializer circuit configured to generate parallel data corresponding with the first error symbol based on the serial error data.

2. The error sampling and decoding system of claim 1, wherein the comparator is configured to compare the first error symbol to a selected one of the first reference value and the second reference value.

3. The error sampling and decoding system of claim 2, wherein the comparator is configured to select the selected one of the first reference value and the second reference value for use in a current compare operation based on the result of the previous compare operation.

4. The error sampling and decoding system of claim 3, wherein the comparator is configured to select a higher of the first reference value and the second reference value for use in the current compare operation in response to the result of the previous compare operation indicating that the first error symbol was greater than the previously selected first or second reference value.

5. The error sampling and decoding system of claim 2, further comprising a multiplexer configured to select the selected one of the first reference value and the second reference value for use in a current compare operation based on the result of the previous compare operation.

6. The error sampling and decoding system of claim 5, wherein the multiplexer is configured to select a higher of the first reference value and the second reference value for use in the current compare operation in response to the result of the previous compare operation indicating that the first error symbol was greater than the previously selected first or second reference value.

7. The error sampling and decoding system of claim 1, wherein the first error symbol has a three-level format.

8. The error sampling and decoding system of claim 1, wherein the system conforms with a graphics double data rate 7 (GDDR7) standard.

9. The error sampling and decoding system of claim 1, wherein the comparator is configured to receive a second error symbol, and to generate additional serial error data representing the second error symbol based on successive comparisons of the second error symbol with the first and second reference values, and wherein the deserializer circuit is configured to generate the parallel data corresponding with both the first error symbol and the second error symbol based on the serial error data representing the first error symbol and based on the additional serial error data representing the second error symbol.

10. A comparator sampler circuit, comprising a single comparator stage configured to generate serial error data representing a first error symbol based on successive comparisons of the first error symbol with a selected one of either a first reference value or a second reference value that is selected based on a result of a previous compare operation.

11. The comparator sampler circuit of claim 10, wherein the comparator stage is configured to select either the first reference value or the second reference value.

12. The comparator sampler circuit of claim 11, wherein the comparator stage is configured to select a higher of the first and second reference values for use in a current compare operation in response to the result of the previous compare operation indicating that the first error symbol was greater than the previously selected first or second reference value.

13. The comparator sampler circuit of claim 10, wherein the first and second reference values are selected by a multiplexer circuit.

14. The comparator sampler circuit of claim 13, wherein the multiplexer circuit is configured to select a higher of the first and second reference values for use in a current compare operation in response to the result of the previous compare operation indicating that the first error symbol was greater than the previously selected first or second reference value.

15. The comparator sampler circuit of claim 10, wherein the first error symbol has a three-level format.

16. A system comprising the comparator sampler circuit of claim 10, wherein the system conforms with a graphics double data rate 7 (GDDR7) standard.

17. A method of using a comparator sampler circuit, the method comprising:

generating serial error data representing a first error symbol based on successive comparisons of the first error symbol with selected first and second reference values, wherein each successive comparison comprises comparing the first error symbol to a selected one of either the first reference value or the second reference value; and successively selecting one of the first reference value or the second reference value for use in a current compare operation based on a result of a previous compare operation.

18. The method of claim 17, wherein successively selecting the one of the first reference value of the second reference value comprises selecting a higher of the first and second reference values for use in the current compare operation in response to the result of the previous compare operation indicating that the first error symbol was greater than a previously selected first or second reference value.

19. The method of claim 17, wherein the first and second reference values are selected by a multiplexer circuit.

20. The method of claim 17, wherein the first and second reference values are selected by the comparator sampler circuit.

* * * * *